United States Patent
Nagaoka et al.

(10) Patent No.: US 9,292,735 B2
(45) Date of Patent: Mar. 22, 2016

(54) LIVING BODY RECOGNIZING DEVICE

(75) Inventors: Nobuharu Nagaoka, Saitama (JP);
Makoto Aimura, Saitama (JP); Kodai Matsuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 118 days.

(21) Appl. No.: 14/131,969

(22) PCT Filed: Aug. 31, 2012

(86) PCT No.: PCT/JP2012/072212
§ 371 (c)(1),
(2), (4) Date: Jan. 10, 2014

(87) PCT Pub. No.: WO2013/047088
PCT Pub. Date: Apr. 4, 2013

(65) Prior Publication Data
US 2014/0153777 A1      Jun. 5, 2014

(30) Foreign Application Priority Data
Sep. 28, 2011   (JP) .................................. 2011-212484

(51) Int. Cl.
*G06K 9/00*  (2006.01)
*G08G 1/16*  (2006.01)
(Continued)

(52) U.S. Cl.
CPC ............ *G06K 9/00369* (2013.01); *G08G 1/166* (2013.01); *H04N 5/33* (2013.01); *H04N 7/18* (2013.01)

(58) Field of Classification Search
None
See application file for complete search history.

(56) References Cited

U.S. PATENT DOCUMENTS

| 5,670,935 A * | 9/1997 | Schofield ............... B60N 2/002 340/435 |
| 5,798,983 A * | 8/1998 | Kuhn ..................... H04B 11/00 367/127 |

(Continued)

FOREIGN PATENT DOCUMENTS

| EP | 1 839 964 A1 | 3/2007 |
| JP | 2000-019259 A | 1/2000 |

(Continued)

OTHER PUBLICATIONS

Partial Supplementary EP Search Report dated Nov. 20, 2014 issued in the counterpart EP Patent Application No. 12837388.3.
(Continued)

*Primary Examiner* — Jayesh A Patel
*Assistant Examiner* — Iman K Kholdebarin
(74) *Attorney, Agent, or Firm* — Carrier Blackman & Associates, P.C.; William D. Blackman; Joseph P. Carrier

(57) ABSTRACT

A living body recognizing device is equipped with a captured image acquiring unit which acquires captured images from infrared cameras having a characteristics that a luminance of an image portion of a target object becomes higher as a temperature of the target object becomes higher than a background, and vice versa, according to a temperature difference between the background and the target object, a living body image extracting unit which executes a first living body image extracting processing of extracting the image portion of the target object assumed as a living body, from a region in the captured image where the luminance is equal to or lower than a first threshold value, and a living body recognizing unit which recognizes an existence of the living body, based on the image portion of the target object extracted by the living body image extracting unit.

6 Claims, 5 Drawing Sheets

(51) Int. Cl.
*H04N 7/18* (2006.01)
*H04N 5/33* (2006.01)

(56) References Cited

U.S. PATENT DOCUMENTS

| | | | | |
|---|---|---|---|---|
| 6,327,536 B1* | 12/2001 | Tsuji | B60Q 9/008 | 340/435 |
| 6,590,521 B1* | 7/2003 | Saka | G01S 13/931 | 180/167 |
| 6,847,894 B1* | 1/2005 | Hasegawa | B60T 7/22 | 340/436 |
| 7,671,725 B2* | 3/2010 | Tsuji | G06K 9/00369 | 340/435 |
| 7,957,556 B2* | 6/2011 | Aimura | G06K 9/00805 | 382/103 |
| 8,139,821 B2* | 3/2012 | Aimura | G01C 3/085 | 382/104 |
| 8,174,578 B2* | 5/2012 | Aimura | B60R 1/00 | 348/135 |
| 8,189,868 B2* | 5/2012 | Aimura | B60R 1/00 | 348/118 |
| 8,242,897 B2* | 8/2012 | Aimura | G06T 7/0075 | 340/436 |
| 8,306,263 B2* | 11/2012 | Nagaoka | G06K 9/00805 | 382/103 |
| 8,401,715 B2* | 3/2013 | Aimura | G06K 9/00805 | 340/435 |
| 8,520,074 B2* | 8/2013 | Wang | H04N 5/33 | 348/164 |
| 8,766,816 B2* | 7/2014 | Takatsudo | B60R 1/00 | 340/3.41 |
| 8,954,252 B1* | 2/2015 | Urmson | G08G 1/166 | 180/167 |
| 8,965,056 B2* | 2/2015 | Matsuda | G06K 9/00805 | 382/103 |
| 8,983,123 B2* | 3/2015 | Matsuda | G06T 7/0046 | 382/103 |
| 8,994,824 B2* | 3/2015 | Aimura | B60R 1/00 | 348/142 |
| 9,037,343 B2* | 5/2015 | Aimura | B60Q 1/085 | 340/435 |
| 9,064,158 B2* | 6/2015 | Aimura | G06K 9/00805 | |
| 9,067,537 B2* | 6/2015 | Aimura | B60R 1/00 | |
| 9,090,205 B2* | 7/2015 | Nagaoka | B60Q 9/008 | |
| 9,158,979 B2* | 10/2015 | Aimura | G06K 9/00805 | |
| 9,165,197 B2* | 10/2015 | Aimura | G06K 9/00825 | |
| 2005/0063565 A1* | 3/2005 | Nagaoka | B60R 21/013 | 382/104 |
| 2005/0231339 A1* | 10/2005 | Kudo | B60R 1/00 | 340/435 |
| 2005/0276447 A1* | 12/2005 | Taniguchi | G06K 9/00362 | 382/103 |
| 2007/0171033 A1* | 7/2007 | Nagaoka | B60W 50/14 | 340/435 |
| 2007/0182528 A1* | 8/2007 | Breed | B60Q 9/008 | 340/435 |
| 2007/0211919 A1 | 9/2007 | Nagaoka et al. | | |
| 2007/0222565 A1* | 9/2007 | Kawamata | B60R 21/0134 | 340/435 |
| 2007/0222566 A1* | 9/2007 | Tsuji | G06K 9/00791 | 340/435 |
| 2007/0248245 A1* | 10/2007 | Aimura | G06K 9/00362 | 382/104 |
| 2008/0036576 A1* | 2/2008 | Stein | B60R 1/00 | 340/425.5 |
| 2009/0041302 A1* | 2/2009 | Nagaoka | G06K 9/00805 | 382/103 |
| 2009/0303176 A1* | 12/2009 | Chen | G06F 3/017 | 345/156 |
| 2010/0156616 A1* | 6/2010 | Aimura | G06T 7/0075 | 340/436 |
| 2010/0278392 A1* | 11/2010 | Nagaoka | B60R 1/00 | 382/106 |
| 2011/0096956 A1* | 4/2011 | Aimura | B60R 1/00 | 382/103 |
| 2011/0109739 A1* | 5/2011 | Aimura | B60R 1/00 | 348/135 |
| 2011/0153262 A1* | 6/2011 | Furuta | B60R 21/0132 | 702/141 |
| 2011/0169746 A1* | 7/2011 | Kitajima | G03B 21/00 | 345/173 |
| 2011/0170748 A1* | 7/2011 | Aimura | G01C 3/085 | 382/106 |
| 2011/0199197 A1* | 8/2011 | Takatsudo | B60R 1/00 | 340/425.5 |
| 2011/0234805 A1* | 9/2011 | Matsuda | B60R 1/00 | 348/148 |
| 2012/0041617 A1* | 2/2012 | Aimura | G06K 9/00805 | 701/1 |
| 2012/0044352 A1* | 2/2012 | Aimura | B60R 1/00 | 348/148 |
| 2012/0281878 A1* | 11/2012 | Matsuda | G06T 7/0046 | 382/103 |
| 2012/0300076 A1* | 11/2012 | Aimura | B60R 1/00 | 348/148 |
| 2013/0229520 A1* | 9/2013 | Aimura | G06K 9/00805 | 348/148 |
| 2013/0235202 A1* | 9/2013 | Nagaoka | H04N 5/33 | 348/148 |
| 2013/0238186 A1* | 9/2013 | Aimura | B60Q 1/085 | 701/36 |
| 2013/0243261 A1* | 9/2013 | Matsuda | G06K 9/00805 | 382/106 |
| 2013/0343071 A1* | 12/2013 | Nagaoka | B60Q 9/008 | 362/466 |
| 2014/0003670 A1* | 1/2014 | Aimura | G06K 9/00805 | 382/104 |
| 2014/0153777 A1* | 6/2014 | Nagaoka | G08G 1/166 | 382/103 |
| 2014/0226015 A1* | 8/2014 | Takatsudo | B60R 1/00 | 348/148 |
| 2014/0270378 A1* | 9/2014 | Aimura | G06K 9/00805 | 382/103 |
| 2014/0285667 A1* | 9/2014 | Aimura | G08G 1/166 | 348/148 |
| 2015/0035962 A1* | 2/2015 | Nagaoka | G08G 1/166 | 348/77 |
| 2015/0169980 A1* | 6/2015 | Matsuda | G06T 7/0081 | 382/103 |

FOREIGN PATENT DOCUMENTS

| | | |
|---|---|---|
| JP | 2003-284057 A | 10/2003 |
| JP | 2006-101384 A | 4/2006 |
| JP | 2007-241740 A | 9/2007 |
| JP | 2009-193130 A | 8/2009 |
| JP | 2011-170499 A | 9/2011 |
| JP | 2011170499 A * | 9/2011 |

OTHER PUBLICATIONS

Yasuno, M. et al., "Pedestrian Detection and Tracking in Far Infrared Images", Intelligent Transportation Systems, 2005, IEEE Vienna, Austria, Sep. 13-16, 2005, Piscataway, NJ, USA, IEEE, Sep. 13, 2005, pp. 131-136.

Office Action dated Jul. 2, 2014 issued over the counterpart Japanese Patent Application 2013-536106.

* cited by examiner

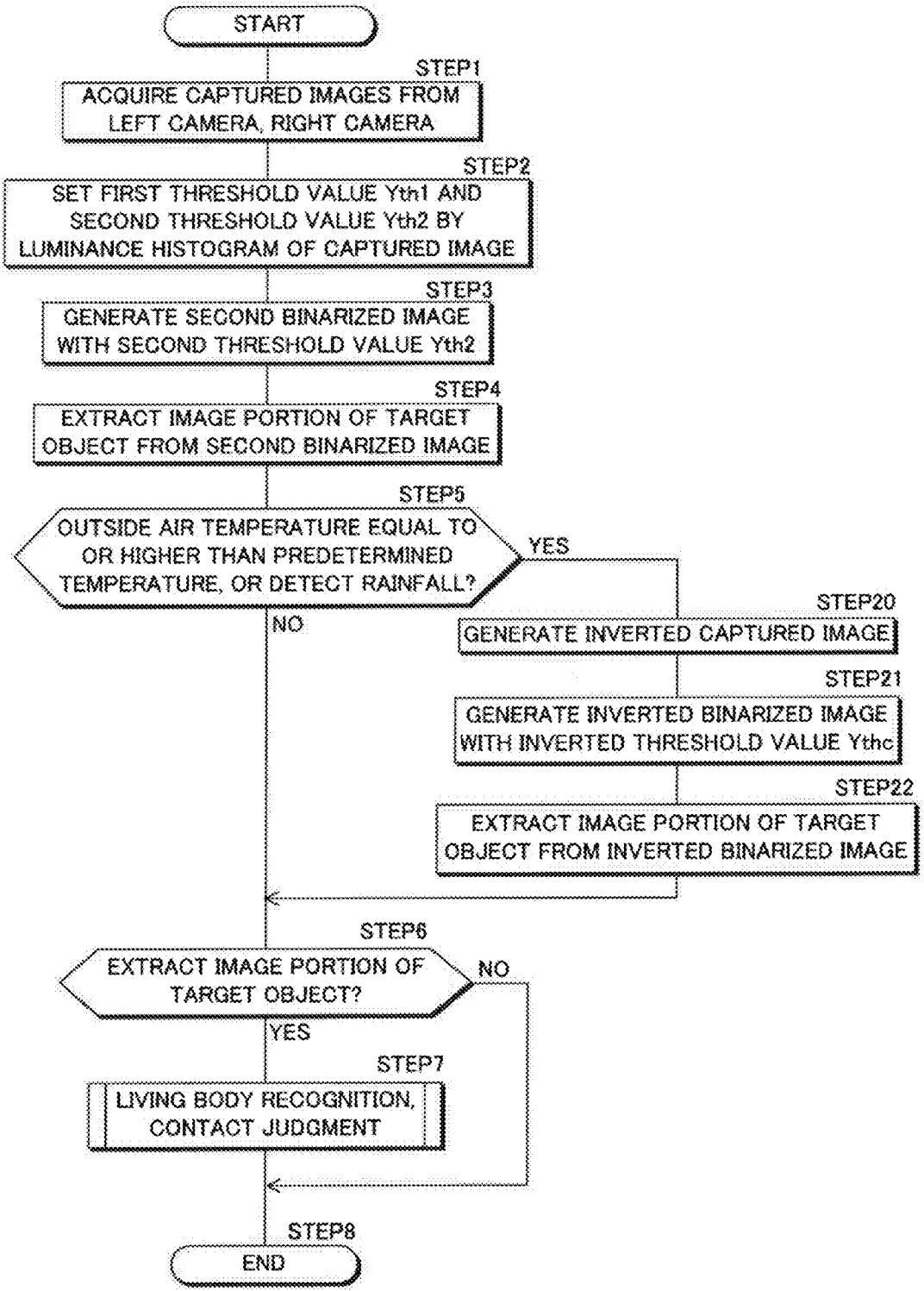

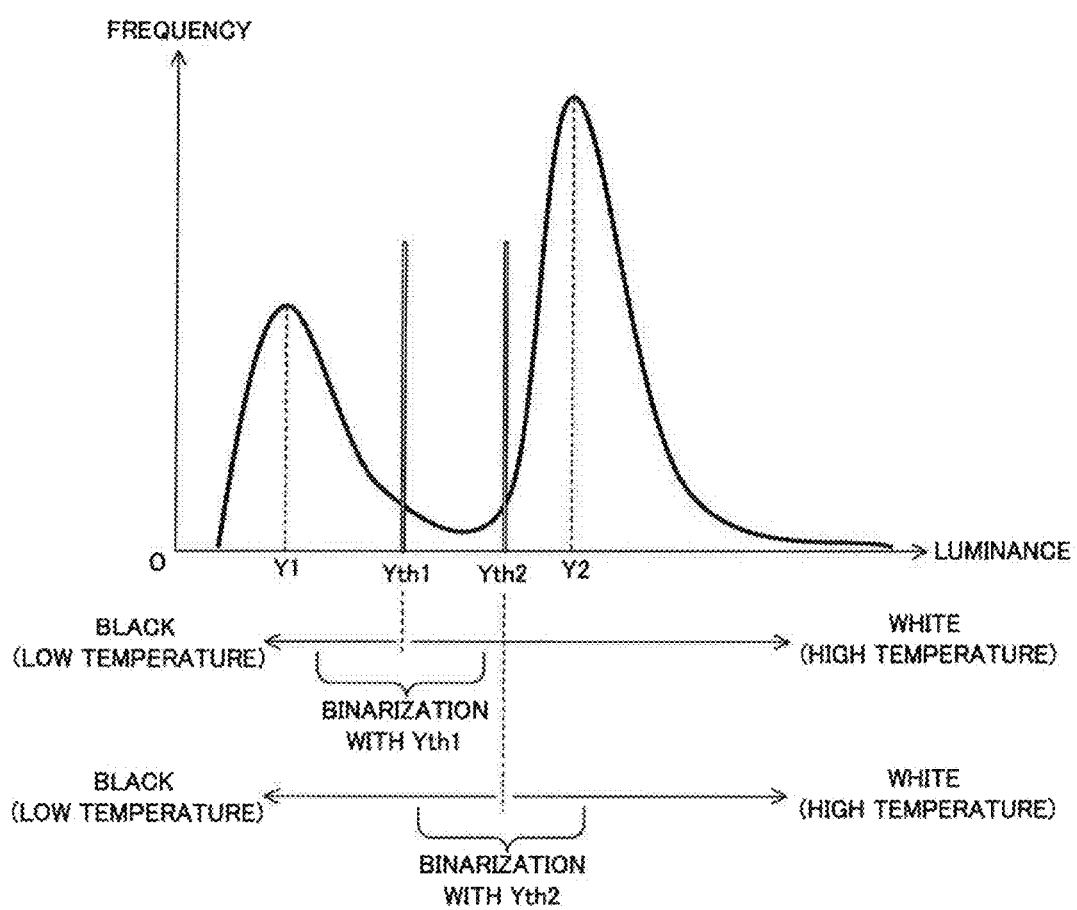

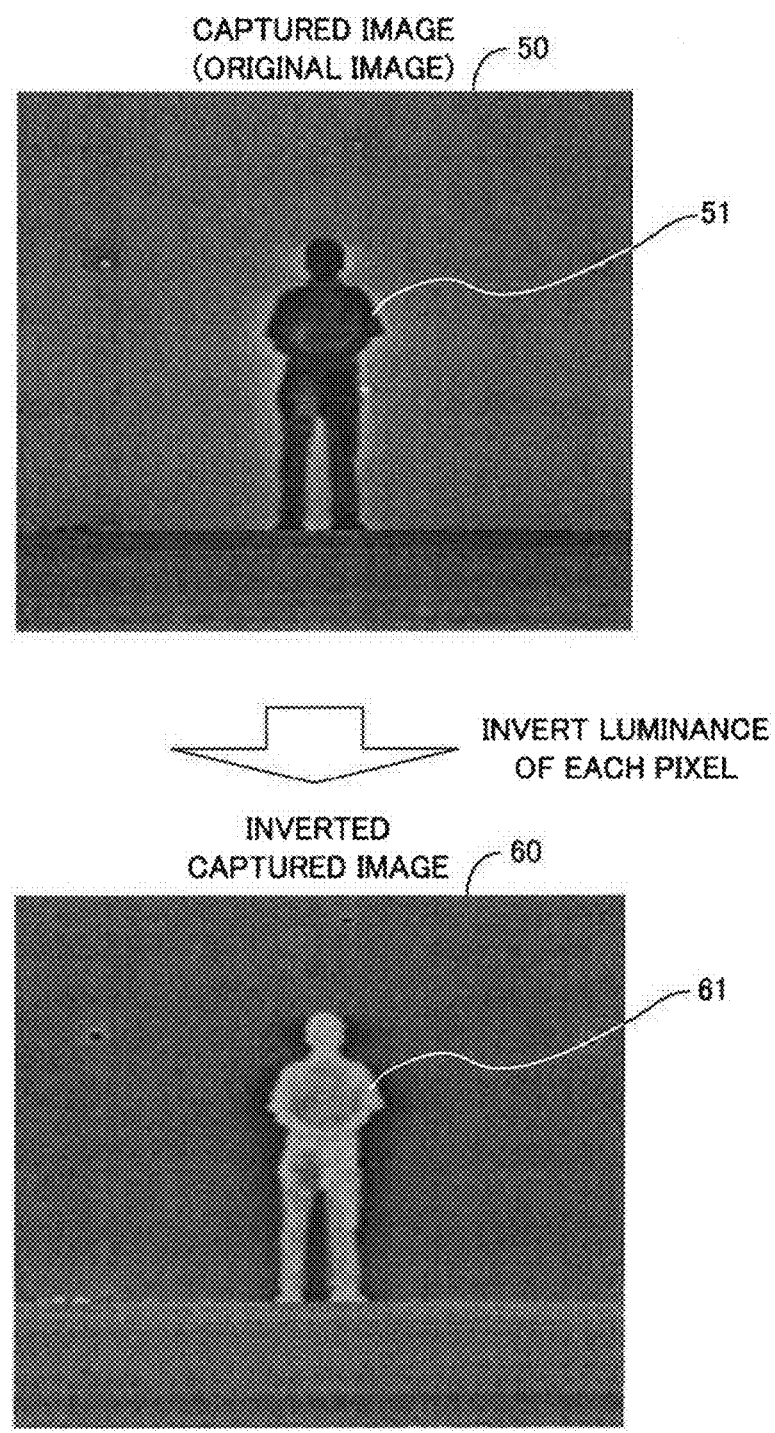

LIVING BODY RECOGNIZING DEVICE

CROSS REFERENCE TO RELATED APPLICATIONS

The present application is the U.S. National Phase of PCT International Application PCT/JP2012/072212, filed Aug. 31, 2012, which, in turn, claimed priority based on Japanese patent application 2011-212484, filed Sep. 28, 2011. The subject matter of each of these priority documents, including specification, claims, and drawings, is incorporated by reference herein.

TECHNICAL FIELD

The present invention relates to a living body recognizing device which recognizes a living body based on a captured image by an infrared camera.

Conventionally, there is known a device in which a living body existing in surroundings of a vehicle is recognized for example, by extracting an image portion of a living body (a pedestrian, a wild animal and the like) having a luminance equal to or more than a luminance threshold value, by binarization of a captured image (a gray scale image) of the surroundings of the vehicle captured by the infrared camera mounted on the vehicle, with the predetermined luminance threshold value (for example, refer to Patent Literature 1).

CITATION LIST

Patent Literature

Patent Literature 1: Japanese Patent Application Laid-Open No. 2003-284057

SUMMARY OF INVENTION

Technical Problem

As the infrared camera, an infrared camera having a characteristics that a luminance of an image portion of a target object becomes higher as a temperature of the target object becomes higher than a background, and the luminance an image portion of the target object becomes lower as the temperature of the target object becomes lower than the background, according to a temperature difference between the background and the target object (a monitor target object such as the living body) (hereinafter referred to as AC characteristics), is used.

In a case where the infrared camera of the AC characteristics is used, for example in a situation where the outside air temperature is higher than the temperature of the living body, the luminance of the image portion of the living body in the captured image by the infrared camera becomes lower than the image portion of the background. And, in such case, it becomes difficult to recognize the living body by extracting the image portion of the living body, from a white region of a binarized image (a high luminance region), which is the binarized captured image of the infrared camera.

The present invention has been made in view of such background, and aims to provide a living body recognizing device which suppresses a state where the recognition of the living body based on the captured image of the infrared camera becomes difficult, arising from the environment surrounding the living body.

Solution to Problem

In order to achieve the above-mentioned object, a living body recognizing device includes a captured image acquiring unit which acquires a captured image having a characteristics that a luminance of an image portion of a target object becomes higher as a temperature of the target object becomes higher than a background, and the luminance of the image portion of the target object becomes lower as the temperature of the target object becomes lower than the background, according to a temperature difference between the background and the target object, using an infrared camera;

a living body image extracting unit which executes a first living body image extracting processing of extracting the image portion of the target object assumed to be a living body, from a region in the captured image in which the luminance is equal to or lower than a predetermined first threshold value; and a living body recognizing unit which recognizes an existence of the living body, based on the image portion of the target object extracted by the living body image extracting unit (a first aspect of the invention).

According to the first aspect of the invention, the living body image extracting unit executes the first living body image extracting processing of extracting the image portion of the target object assumed to be the living body, from the region in the captured image in which the luminance is equal to or lower than the first threshold value. By doing so, it becomes possible to extract the image portion of the target body assumed to be the living body, and recognize the existence of the living body with the living body recognizing unit, even in a situation where the temperature of the living body is lower than a temperature of the surroundings, and the luminance of the image portion of the living body in the captured image becomes lower than the background. Therefore, it becomes possible to suppress a state where the recognition of the living body based on the captured image of the infrared camera becomes difficult, arising from the environment surrounding the living body.

The background in the present invention means objects existing behind the target object (wall surface of a structure, a road surface, and the like), when capturing the target object with the infrared camera. Further, as the captured image having the above-mentioned characteristics, a captured image by an infrared camera which outputs a video having the above-mentioned characteristics, or a captured image provided with the above-mentioned characteristics by performing a video filter processing and the like to an image of an ordinary infrared camera, in which a luminance of corresponding pixel becomes higher as the temperature of the target object becomes higher, may be used.

Further, in the first aspect of the invention, the living body image extracting unit generates an inverted captured image in which the luminance of each pixel of the captured image is inverted, and executes the first living body image extracting processing by extracting the image portion of the target object assumed to be the living body, from a region in the inverted captured image in which the luminance is equal to or higher than an inverted threshold value corresponding to the first threshold value (a second aspect of the invention).

According to the second aspect of the invention, the living body image extracting unit is capable of extracting the image portion of the low luminance from the captured image, by performing a general extracting processing of the image portion of extracting the image portion with high luminance, to the inverted captured image. Therefore, it is not necessary to prepare separately a processing program for extracting the image portion of the low luminance from the captured image.

Inverting the luminance of each pixel means subtracting the luminance of each pixel from a maximum value of a luminance range, and replacing the luminance of each pixel representing a height from a minimum value of the luminance range, with a luminance corresponding to a remaining height to the maximum value of the luminance range.

Further, in the first aspect of the invention or the second aspect of the invention, the living body image extracting unit executes the first living body image extracting processing, and a second living body image extracting processing which extracts the image portion of the target object assumed to be the living body, from a region in the captured image in which the luminance is equal to or higher than a predetermined second threshold value (a third aspect of the invention).

According to the third aspect of the invention, the living body image extracting unit is capable of extracting the image portion of the target object assumed to be the living body from the captured image, in both situations of a case where the temperature of the living body is higher than the surrounding temperature, and a case where the temperature of the living body is lower than the surrounding temperature, by executing the first living body image extracting processing and also the second living body image extracting processing.

Further, in the third aspect of the invention, the first threshold value and the second threshold value are set to different values (a fourth aspect of the invention).

According to the fourth aspect of the invention, it becomes possible to set the first threshold value to a value capable of easily extracting the image portion of the target object with low luminance by the first living body image extracting processing, and also to set the second threshold value to a value capable of easily extracting the image portion of the target object with high luminance by the second living body image extracting processing.

Further, in the fourth aspect of the invention, the living body image extracting unit sets the first threshold value and the second threshold value, according to a luminance distribution of the captured image (a fifth aspect of the invention).

According to the fifth aspect of the invention, it becomes possible to judge the first threshold value and the second threshold value capable of extracting the image portion of the target object with low luminance and the image portion of the target object with high luminance, from the luminance distribution of the captured image, with good efficiency.

Further, in any one of the first aspect of the invention through the fifth aspect of the invention, the living body recognizing device further includes an outside air temperature sensor which detects an outside air temperature, and the living body image extracting unit executes the first living body image extracting processing, when a detected temperature of the outside air temperature sensor is equal to or higher than a predetermined temperature (a sixth aspect of the invention).

According to the sixth aspect of the invention, by executing the first living body image extracting processing in a situation in which the outside air temperature is equal to or higher than the predetermined temperature, and the outside air temperature becomes higher than the temperature of the living body, it becomes possible to extract the image portion of the target object assumed to be the living body, from a region of the captured image in which the luminance is equal to or lower than the first threshold value.

Further, in any one of the first aspect of the invention through the sixth aspect of the invention, the living body recognizing device further includes a rainfall detecting unit which detects a rainfall, and the living body image extracting unit executes the first living body image extracting processing, when the rainfall is detected by the rainfall detecting unit (a seventh aspect of the invention).

According to the seventh aspect of the invention, by executing the first living body image extracting processing in a situation in which the temperature of the living body became lower than the surrounding temperature from the rainfall, it becomes possible to extract the image portion of the target object assumed to be the living body, from the region of the captured image in which the luminance is equal to or lower than the first threshold value.

Further, in any one of the first aspect of the invention through the seventh aspect of the invention, the living body image extracting unit executes the first living body image extracting processing, when a contrast of the captured image is equal to or less than a predetermined width (an eighth aspect of the invention).

According to the eighth aspect of the invention, when the contrast of the captured image becomes low to equal to or lower than the predetermined width, it is assumed that the target object and the surroundings are all in a high-temperature situation. In such situation, there is a high possibility that the image portion of the living body, which has high luminance in normal state, has low luminance. Therefore, by executing the first living body image extracting processing in such case, it is expected that the image portion of the living body with low luminance is extracted.

BRIEF DESCRIPTION OF THE DRAWINGS

FIG. 3 is a flowchart of a target object extracting processing;

FIG. 4 is an explanatory diagram of setting of a binarization threshold value; and FIG. 5 is an explanatory diagram of an inverted captured image.

DESCRIPTION OF EMBODIMENTS

Figure 1:
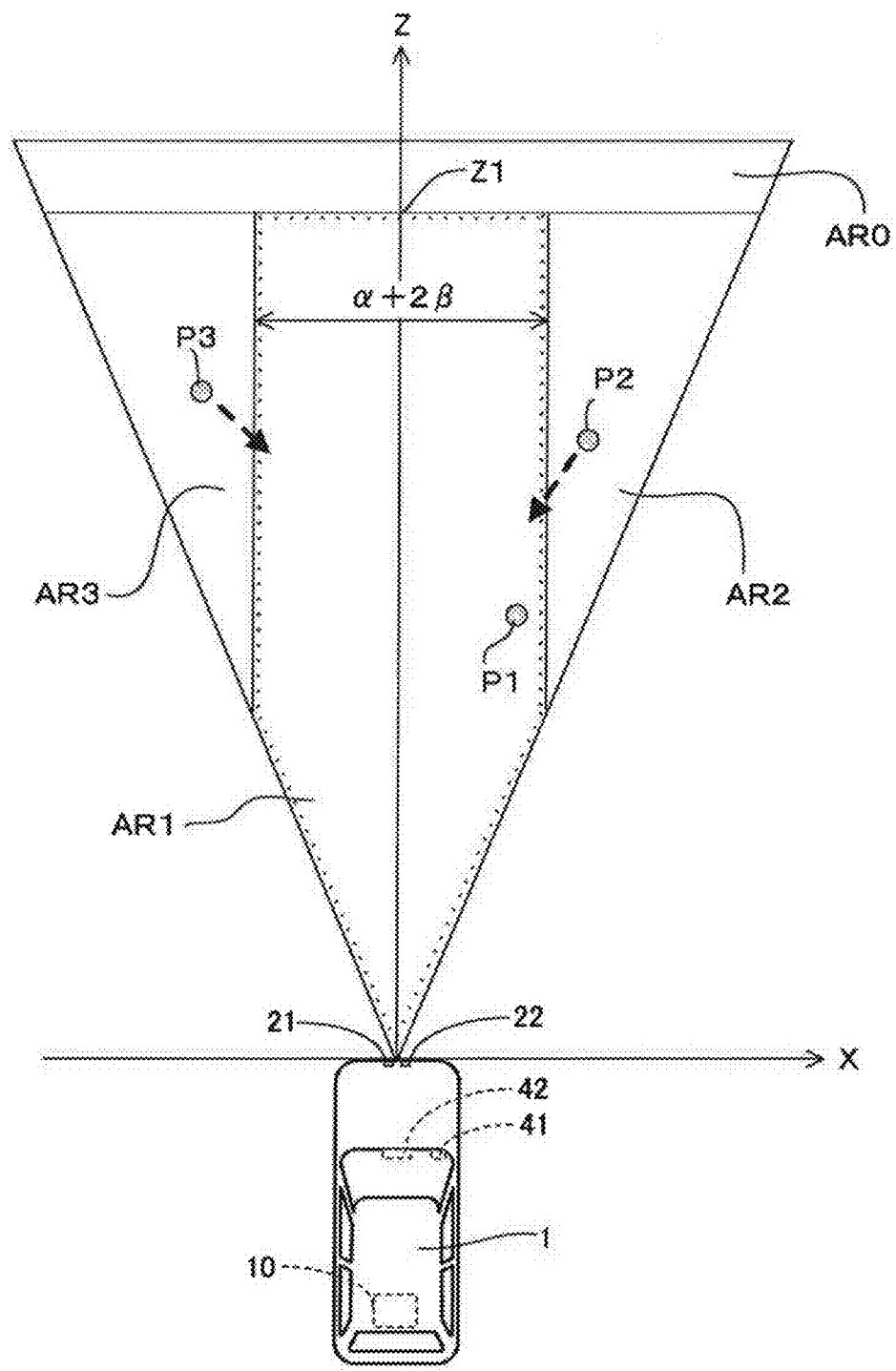
FIG. 1 is an explanatory diagram of an embodiment of a living body recognizing device.

An embodiment of a living body recognizing device of the present invention will be explained with reference to FIG. 1 through FIG. 5. With reference to FIG. 1, a living body recognizing device 10 of the present embodiment is used by being mounted on a vehicle 1. The living body recognizing device 10 recognizes living bodies (pedestrians, wild animals and the like) existing ahead of the vehicle 1, based on captured images from a left camera 21 and a right camera 22.

The living body recognizing device 10 detects a distance between the vehicle 1 and a target object existing ahead of the vehicle 1 at each predetermined control cycle, tracks a position of the target object, and when there is a fear that the target object contacts the vehicle 1, performs an attention-drawing processing of performing a warning display to an indicator 42, and also outputting a warning sound from a loudspeaker 41, so as to prompt attention of the driver of the vehicle 1 to the target object.

The living body recognizing device 10 performs the attention-drawing processing, when the target object in an approach judging region AR1 (exemplified by P1 in FIG. 1) is recognized. The approach judging region AR1 is set inside a capturing area AR0 of the left camera 21 and the right camera 22, to a region closer than Z1 of a Z-axis set in a traveling direction of the vehicle 1, and has a width obtained by adding a width a of the vehicle 1 with allowances β on both right and left sides, in an X-axis direction which is set to a width direction of the vehicle 1.

Further, the living body recognizing device 10 performs the attention-drawing processing, also when there is a possibility that the target object existing in entry judging regions AR2, AR3 set to both right and left sides of the approach judging region AR1 (exemplified by P2, P3 in FIG. 1) enters into the approach judging region AR1.

The left camera 21 and the right camera 22 are infrared cameras having a characteristics that, according to a temperature difference between a background and the target object, a luminance of an image portion of the target object becomes higher as the temperature of the target object becomes higher than the background, the luminance of the image portion of the target object becomes lower as the temperature of the target object is lower than the background (AC characteristics).

The left camera 21 and the right camera 22 are arranged at approximately symmetrical positions with respect to a central axis (the Z-axis) of a lateral direction of the vehicle 1 (the width direction, the X-axis direction). Further, the left camera 21 and the right camera 22 are fixed so that optical axes become parallel with each other, and a height from a road surface becomes identical.

Figure 2:
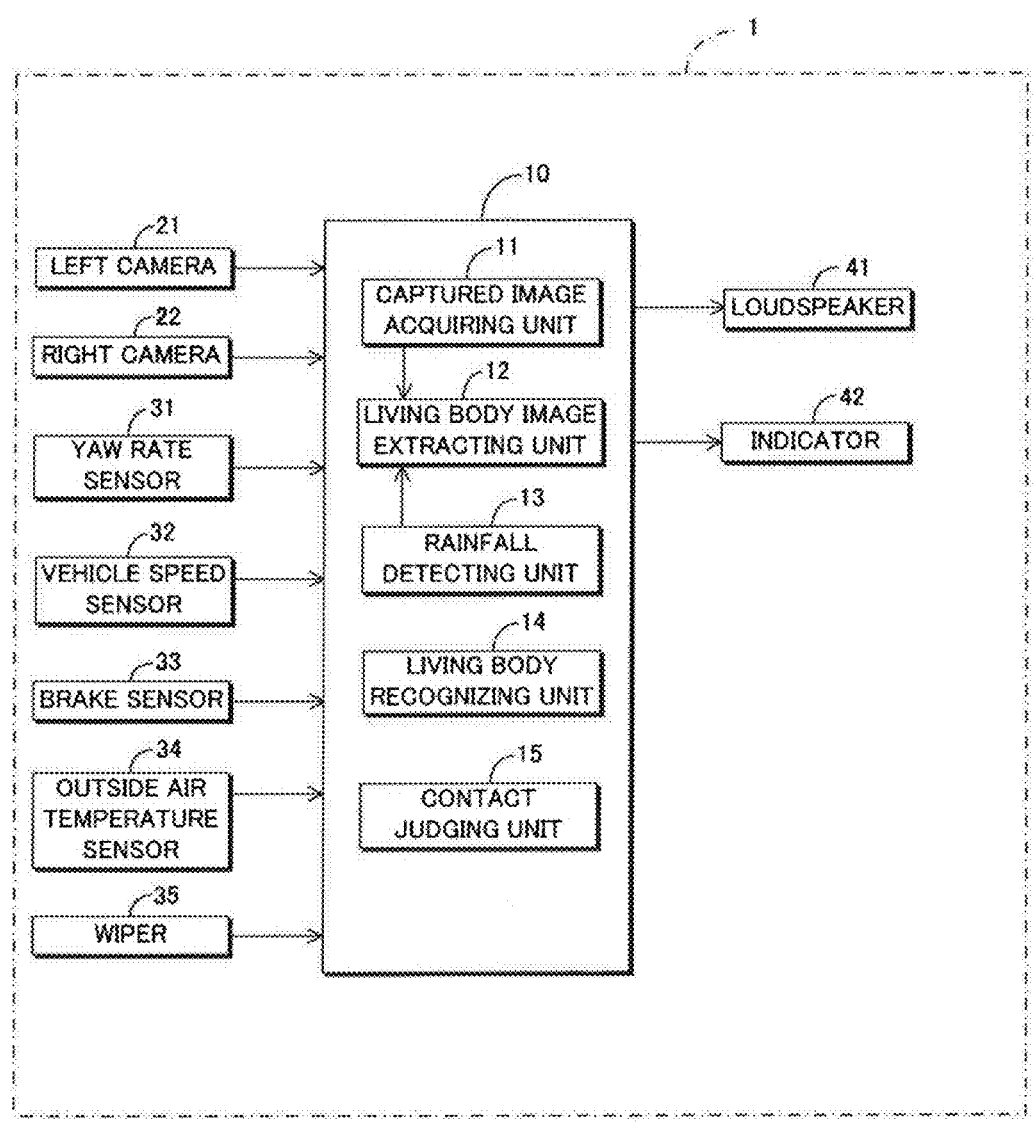
FIG. 2 is a configuration view of the living body recognizing device.

Next, with reference to FIG. 2, the living body recognizing device 10 is input with video signals of the left camera 21 and the right camera 22. Further, the living body recognizing device 10 is input with detected signals from a yaw rate sensor 31, a vehicle speed sensor 32, a brake sensor 33, and an outside air temperature sensor 34, which are mounted to the vehicle 1, and a signal indicating an activating state of a wiper 35. Further, the output of the loudspeaker 41 and the display of the indicator 42 are controlled by control signals output from the living body recognizing device 10.

The living body recognizing device 10 is an electronic circuit unit configured from a CPU, a memory, an interface circuit and the like, that are not shown, and by executing programs for living body recognition stored in the memory with the CPU, functions as a captured image acquiring unit 11 which converts the video signals output from the left camera 21 and the right camera 22 into digital signals, and which stores the same as data of the captured images by the left camera 21 and the right camera 22 to an image memory (not shown), a living body image extracting unit 12 which extracts the image portion of the target object assumed to be a living body from the captured image, a rainfall detecting unit 13 which detects existence or non-existence of a rainfall from the activating state of the wiper 35, a living body recognizing unit 14 which recognizes the existence of the living body from the image portion of the target object extracted by the living body image extracting unit 12, and a contact judging unit 15 which determines a contact possibility of the vehicle 1 and the living body recognized by the living body recognizing unit 14.

Next, a recognizing processing of the living body existing ahead of the vehicle 1 by the living body recognizing device 10 will be explained in accordance with a flowchart shown in FIG. 3. The living body recognizing device 10 recognizes the living body existing ahead of the vehicle 1, by executing the flowchart of FIG. 3 in each predetermined control cycle.

STEP 1 in FIG. 3 is a processing by the captured image acquiring unit 11. The captured image acquiring unit 11 converts the video signal output from the left camera 21 and the right camera 22 into digital signal, and stores the same as the captured image (gray scale image) of the left camera 21 and the right camera 22 in the image memory.

Subsequent STEP 2 through STEP 5, and STEP 20 through STEP 22, are processing by the living body image extracting unit 12. In the present embodiment, the living body image extracting unit 12 executes the processing of STEP 2 through STEP 5 and STEP 20 through STEP 22 to the captured image of the right camera 22 (hereinafter referred simply as the captured image).

In STEP 2, the living body image extracting unit 12 sets a first threshold value Yth1 and a second threshold value Yth2 for generating a binary image, from a luminance histogram of the captured image (corresponds to a luminance distribution of the present invention). FIG. 4 shows an example of the luminance histogram of the captured image, setting an axis of ordinate to a luminance, and an axis of abscissas to a frequency of appearance of pixels (a number of pixels) having each luminance.

In the luminance histogram of FIG. 4, there are two peaks of frequency (Y1, Y2), and the living body image extracting unit 12 sets the first threshold value Yth1, which is a binarization threshold value for extracting the image portion corresponding to a peak Y1 of a low luminance side, and the second threshold value Yth2, which is a binarization threshold value for extracting the image portion corresponding to a peak Y2 of a high luminance side.

With the first threshold value Yth1, by performing the binarization processing of setting the pixels with the luminance equal to or lower than the first threshold value Yth1 to black (0), and setting the pixels with the luminance higher than the first threshold value Yth1 to white (1), it becomes possible to extract the image portion corresponding to the peak Y1 from a black region in the binarized image. Therefore, in a case where the outside air temperature is higher than a temperature of the living body, and the luminance of the image portion of the living body in the captured image is lower than the luminance of the background, it becomes possible to extract the image portion of the living body.

Further, with the second threshold value Yth2, by performing the binarization processing of setting the pixels with the luminance equal to or lower than the second threshold value Yth2 to black (0), and setting the pixels with the luminance higher than the second threshold value Yth2 to white (1), it becomes possible to extract the image portion corresponding to the peak Y2 from a white region of the binarized image. Therefore, in a general situation in which the outside air temperature is lower than the temperature of the living body, and the luminance of the image portion of the living body is higher than the background, it becomes possible to extract the image portion of the pedestrian.

In subsequent STEP 3, the living body image extracting unit 12 generates a binarized image (a second binarized image) with the second threshold value Yth2. Further, in STEP 4, the living body image extracting unit 12 extracts the image portion of the target object assumed to be the living body, from the white region of the second binarized image.

Now, the image portion of the target object assumed to be the living body is an image portion in which a height, a width, a height from a road surface, a luminance average value, a luminance distribution and the like fall within a preliminarily set range (which is set assuming the living body such as the pedestrian, the wild animal and the like). The processing of STEP 3 through STEP 4 corresponds to a second living body image extracting processing of the present invention.

In subsequent STEP 5, the living body image extracting unit 12 determines whether or not the outside air temperature detected by the outside air temperature sensor 34 is equal to or higher than a predetermined temperature, and whether or not a rainfall is detected by the rainfall detecting unit 13. Thereafter, when the outside air temperature is equal to or higher than the predetermined temperature, or when the rainfall is detected, the process branches to STEP 20, and when the outside air temperature is lower than the predetermined temperature, and when no rainfall is detected, the process proceeds to STEP 6.

In a case where the process branches to STEP 20, there is a possibility that the outside air temperature is equal to or higher than the predetermined temperature and the outside air temperature is lower than the temperature of the living body, or the temperature of the living body becomes lower than the surrounding temperature by the rainfall, so that the luminance of the image portion of the living body in the captured image becomes lower than the background.

Therefore, in such case, the living body image extracting unit 12 extracts the image portion of the target object with low luminance from the captured image, with STEP 20 through STEP 22. In STEP 20, the living body image extracting unit 12 generates an inverted captured image in which the luminance of each pixel of the captured image is inverted.

FIG. 5 shows a captured image (original image) 50, and an inverted captured image 60 in which the luminance of each pixel of the captured image 50 is inverted. In the captured image 50, the luminance of an image portion 51 of the living body (the pedestrian) is lower than the background, whereas in the inverted captured image 60, the luminance of an image portion 61 of the living body is higher than the background.

The inversion of the luminance of each pixel is performed by subtracting the luminance of each pixel from a maximum value of the luminance. For example, in a case of an 8-bit gradation (luminance range: 0 to 255), the luminance is inverted from the following expression (1).

$$Yc = 255 - Y \quad (1)$$

where Yc: luminance of each pixel after inversion, and Y: luminance of each pixel in the captured image.

In subsequent STEP 21, the living body image extracting unit 12 generates a binarized image (an inverted binarized image), by binarizing the inverted captured image by an inverted threshold value Ythc in which the first threshold value Yth1 is inverted (=the maximum value of the luminance−Yth1). The inverted binarized image is an image in which white pixels and black pixels of the binarized image generated by the binarization of the captured image with the first threshold value Yth1 (a first binarized image) are interchanged.

Thereafter, in subsequent STEP 22, the living body image extracting unit 12 extracts the image portion of the target object assumed to be the living body from the white region of the inverted binarized image, in a similar processing as above-mentioned STEP 4, and proceeds to STEP 6.

As is explained above, by generating the inverted binarized image, it becomes possible to substitute the processing of extracting the image portion of the target object from the black region of the first binarized image, to the processing of extracting the image portion of the target object from the white region of the inverted binarized image. The processing of STEP 20 through STEP 22 corresponds to a first living body image extracting processing of the present invention.

In this case, as a program for extracting the image portion of the target object from the binarized image, only the program for extracting the image portion from the white region of the binarized image should be stored to the memory, and it is not necessary to separately prepare a program for extracting the image portion of the target object from the black region of the binarized image. Therefore, it becomes possible to simplify the program for recognizing the living body, and to decrease a program capacity.

STEP 6 through STEP 7 are processing by the living body recognizing unit 14 and the contact judging unit 15. The living body recognizing unit 14 determines whether or not the image portion of the target object is extracted by the living body image extracting unit 12, in STEP 6. Thereafter, when the image portion of the target object is extracted, the process proceeds to STEP 7, and when the image portion of the target object it not extracted, the process branches to STEP 8 and terminates the processing.

In STEP 7, the living body recognizing unit 14 recognizes a position of the target object in real space, from the image portion of the target object extracted by the living body image extracting unit 12. This recognizing processing is performed, for example with a method disclosed in Japanese Patent Application Laid-Open No. 2003-284057 mentioned above, by converting a position of the image portion of the target object in the captured image (camera coordinate) to the real space position (real space coordinate), based on a distance between the vehicle 1 and the target object, which is calculated from a disparity of the images of the target object between the captured image of the left camera 21 and the captured image of the right camera 22.

The contact judging unit 15 performs the attention-drawing processing of performing the warning display to the indicator 42, and also outputting the warning sound from the loudspeaker 41, when the position of the target object is inside the approach judging region AR1 (refer to FIG. 1), and when there is a possibility of the target object entering the approach judging region AR1 from the entrance determining regions AR2, AR3 (refer to FIG. 1), from a moving vector of the target object calculated from the traveling speed of the vehicle 1 detected by the vehicle speed sensor 32, and the yaw rate of the vehicle 1 detected by the yaw rate sensor 31.

The contact judging unit 15 prompts the attention of the driver of the vehicle 1 to the target object by the attention-drawing processing, proceeds to STEP 8 and terminates the process. When a braking operation by the driver is detected by the brake sensor 33 (refer to FIG. 2), it could be determined that the driver is recognizing the existence of the target object, and is attempting to avoid contact, so that the contact judging unit 15 will not perform the attention-drawing processing.

In the present embodiment, the living body image extracting unit 12 generated the inverted binary image, and extracted the image portion of the target object in which the luminance in the captured image is lower than the background, from the white region of the inverted binarized image, by the processing of STEP 20 through STEP 22 in FIG. 3. However, the living body image extracting unit 12 may extract the image portion of the target object from the black region of the first binarized image (the binarized image obtained by binarization of the captured image with the first threshold value Yth1), without generating the inverted binarized image.

Further, in the present embodiment, the living body image extracting unit 12 branched to STEP 20 when the outside air temperature is equal to or higher than the predetermined temperature, or when the rainfall is detected, in STEP 5 of FIG. 3, and performed the processing of extracting the image portion with low luminance. However, the processing of extracting the image portion with low luminance after STEP 20 may be constantly performed, without determining the condition of STEP 5.

Further, in the present embodiment, the second living body image extracting processing of extracting the image portion of the target object is performed, from the second binarized image generated by binarization of the captured image with the second threshold value Yth2, in STEP 3 through STEP 4 in FIG. 3. However, the effect of the present invention may be obtained, even when the second living body image extracting processing is not performed.

Further, in the present embodiment, the living body image extracting unit 12 sets the first threshold value Yth1 and the second threshold value Yth2, based on the luminance histogram of the captured image, in STEP 2 of FIG. 3. However, the first threshold value Yth1 and the second threshold value Yth2 may be set, according to other conditions (the outside air temperature, and the like).

Further, in the present embodiment, the binarized image is generated, and the image portion of the target object is extracted from the binarized image, in STEP 3 through STEP 4, and STEP 20 through STEP 22 in FIG. 3. However, the image portion of the target object may be extracted from the region in which the luminance is equal to or lower than the first threshold value, or the image portion of the target object may be extracted from the region in which the luminance is equal to or higher than the second threshold value, directly from the captured image (the gray scale image) without generating the binarized image.

Further, in the present embodiment, the rainfall detecting unit 13 detected the existence or non-existence of the rainfall from the activating state of the wiper 35. However, the rainfall may be detected by a raindrop sensor, or the rainfall may be detected by receiving a weather information via communication.

Further, in the present embodiment, an example where the living body recognizing device 10 is mounted to the vehicle 1 is shown. However, the application of the present invention is possible, even when the living body recognizing device is provided to a road, an entrance of a facility, and the like.

Further, in the present embodiment, the process branched to STEP 20 and the image portion of the target object is extracted using the inverted captured image, when the outside air temperature is equal to or higher than the predetermined temperature, and when the rainfall is detected, in STEP 5 in FIG. 3. Furthermore, the image portion of the target object may be extracted using the inverted captured image, when a contrast of the captured image is equal to or less than a predetermined width.

Further, in the present embodiment, the infrared cameras 21, 22 having the characteristics that the luminance of the image portion of the target object becomes higher as the temperature of the target object becomes higher than the background, and the luminance of the image portion of the target object becomes lower as the temperature of the target object becomes lower than the background, according to the temperature difference between the background and the target object (the AC characteristics), is used. However, an ordinary infrared camera in which the luminance of the corresponding pixels becomes higher according to the temperature of the target object may be used. In this case, a captured image having similar characteristics as the AC characteristics may be generated, by performing a video filter processing and the like, to the image of the infrared camera.

Further, in the present embodiment, two cameras (stereo camera), that is, the left camera 21 and the right camera 22, are used. However, a configuration of a single camera (a monocular camera) may also be adopted. In this case, the distance between the vehicle and the target object may be detected, based on a rate of change of a size of the image portions of an identical object among time-series images by the monocular camera.

EXPLANATION OF REFERENCES

1 . . . vehicle, 10 . . . living body recognizing device, 11 . . . captured image acquiring unit, 12 . . . living body image extracting unit, 13 . . . rainfall detecting unit, 14 . . . living body recognizing unit, 15 . . . contact judging unit, 21 . . . left camera, 22 . . . right camera, 31 . . . yaw rate sensor, 32 . . . vehicle speed sensor, 33 . . . brake sensor, 34 . . . outside air temperature sensor, 35 . . . wiper, 41 . . . loudspeaker, 42 . . . indicator.

The invention claimed is:

1. A living body recognizing device, comprising:
a captured image acquiring unit which acquires a captured image having a characteristics that a luminance of an image portion of a target object becomes higher as a temperature of the target object becomes higher than a background, and the luminance of the image portion of the target object becomes lower as the temperature of the target object becomes lower than the background, according to a temperature difference between the background and the target object, using an infrared camera;
a living body image extracting unit which sets for the luminance, a first threshold value and a second threshold value which is higher than the first threshold value, and which executes a first living body image extracting processing of extracting the image portion of the target object assumed to be a living body, from a region of the captured image in which the luminance is equal to or lower than the first threshold value, regardless of whether or not an area of the region in which the luminance is equal to lower than the first threshold value is larger than an area of a region in which the luminance is higher than the first threshold value and executes a second living body image extracting processing which extracts the image portion of the target object assumed to be the living body from a region in the captured image in which the luminance is equal to or higher than the second threshold value with respect to an identical range as a range of the captured image in which the first living body image extracting processing is executed; and
a living body recognizing unit which recognizes an existence of the living body, where present, based on the image portion of the target object extracted by the living body image extracting unit.

2. The living body recognizing device according to claim 1, wherein the living body image extracting unit generates an inverted captured image in which the luminance of each pixel of the captured image is inverted, and executes the first living body image extracting processing by extracting the image portion of the target object assumed to be the living body, from a region of the inverted captured image in which the luminance is equal to or higher than an inverted threshold value corresponding to the first threshold value.

3. The living body recognizing device according to claim 1, wherein the first threshold value and the second threshold value are set to different values.

4. The living body recognizing device according to claim 3, wherein
the living body image extracting unit sets the first threshold value and the second threshold value, according to a luminance distribution of the captured image.

5. The living body recognizing device according to claim 1, wherein the living body recognizing device further comprises a rainfall sensor for detecting a rainfall, and wherein the living body image extracting unit executes the first living body image extracting processing, when the rainfall is detected by the rainfall sensor.

6. The living body recognizing device according to claim 1, wherein
the living body image extracting unit executes the first living body image extracting processing, when a contrast of the captured image, as represented on a luminance histogram generated from the captured image, is equal to or less than a predetermined width.

* * * * *